(12) United States Patent
Ma et al.

(10) Patent No.: US 11,252,452 B2
(45) Date of Patent: Feb. 15, 2022

(54) VIDEO ENCRYPTION METHOD AND APPARATUS, IMAGE CAPTURE DEVICE AND READABLE STORAGE MEDIUM

(71) Applicant: Guangdong University of Technology, Guangzhou (CN)

(72) Inventors: Jianguo Ma, Guangzhou (CN); Shaohua Zhou, Guangzhou (CN); Zhiyuan Gao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 149 days.

(21) Appl. No.: 16/665,001

(22) Filed: Oct. 28, 2019

(65) Prior Publication Data
US 2021/0044840 A1 Feb. 11, 2021

(30) Foreign Application Priority Data
Aug. 9, 2019 (CN) .......................... 201910735984.0

(51) Int. Cl.
| | |
|---|---|
| H04N 21/23 | (2011.01) |
| H04N 21/2347 | (2011.01) |
| H04N 7/167 | (2011.01) |
| H04N 21/234 | (2011.01) |
| H04N 21/235 | (2011.01) |

(52) U.S. Cl.
CPC ....... H04N 21/2347 (2013.01); H04N 7/1675 (2013.01); H04N 21/2351 (2013.01); H04N 21/23406 (2013.01)

(58) Field of Classification Search
None
See application file for complete search history.

(56) References Cited

U.S. PATENT DOCUMENTS

2003/0206635 A1* 11/2003 Morley ................ H04N 19/176
380/269

FOREIGN PATENT DOCUMENTS

| CN | 110035327 A | 7/2019 |
|---|---|---|
| WO | 2013044800 A1 | 4/2013 |

OTHER PUBLICATIONS

Proposed Video Encryption vs Other Algorithms A comparative Study; Mar. 2013.*

(Continued)

*Primary Examiner* — Cai Y Chen

(57) ABSTRACT

The present disclosure discloses a video encryption method comprising: acquiring image frames continuously by using an image acquisition component, and storing the image frames into a frame buffer; acquiring a time encryption sequence, and using the time encryption sequence to obtain an address encryption sequence; and reading each of the image frames in the frame buffer according to the address encryption sequence to obtain an encrypted video when the frame buffer is full. The method continuously acquires the image frames and uses the time encryption sequence to obtain the address encryption sequence, and when the frame buffer is full, each of the image frames in the frame buffer is read according to the address encryption sequence to obtain an encrypted video. In addition, the present disclosure also provides a video encryption apparatus, an image capture device, and a computer readable storage medium, which also have the above-mentioned beneficial effects.

8 Claims, 2 Drawing Sheets

(56) References Cited

OTHER PUBLICATIONS

Ajay Kulkarni et al:"Proposed Video Encryption Algorithm v/s Other Existing Algorithms: A Comparative Study", International Journal of Computer Applications, vol. 65, No. 1, Mar. 1, 2013, pp. 1-5, XP55680630, DOI: 10.5120/10885-5777.
G. Shukla et al:"Algorithmic Approach To Cloud Data Security", International Journal of Computer Sciences and Engineering, vol. 6, No. 4, Apr. 30, 2018, pp. 194-199, XP055680645, DOI: 10.26438/ijcse/v6i4.194199.
Combined Search and Examination Report for the corresponding GB application No. 1915561.3, Jun. 1, 2020, 7 pages total.

* cited by examiner

VIDEO ENCRYPTION METHOD AND APPARATUS, IMAGE CAPTURE DEVICE AND READABLE STORAGE MEDIUM

CROSS-REFERENCE TO RELATED APPLICATIONS

The present application claims the priority of Chinese patent application No. 201910735984.0, filed on Aug. 9, 2019, which is hereby incorporated by reference in its entirety.

TECHNICAL FIELD

The present disclosure relates to the technical field of information security, and in particular, to a video encryption method and apparatus, an image capture device, and a computer readable storage medium.

TECHNICAL BACKGROUND

With the rapid development of information technology, information security is particularly important. Image information and video information for military, commercial and high-tech industries require very strict confidentiality measures to prevent national security and economic threats.

A conventional video encryption technology performs spatial scrambled encryption or time scrambled encryption of an original video by using compression, encoding and the like after the original video is acquired and outputted in a normal time sequence. Such an encryption technology can only encrypt the original video obtained after it is acquired and outputted. If an original video is leaked after it is acquired and outputted and before it is subjected to a conventional encryption processing, the original video is not protected by any encryption measures. Therefore, the existing video encryption technology has security vulnerabilities.

Therefore, how to solve the problem that the existing video encryption technology has security vulnerabilities is a technical problem that those skilled in the art need to solve.

SUMMARY

In view of this, an object of the present disclosure is to provide a video encryption method and apparatus, an image capture device, and a computer readable storage medium, which solve the problem that the existing video encryption technology has security vulnerabilities.

To solve the above technical problem, the present disclosure provides a video encryption method comprising:

acquiring image frames continuously by using an image acquisition component, and storing the image frames into a frame buffer;

acquiring a time encryption sequence, and using the time encryption sequence to obtain an address encryption sequence; and reading each of the image frames in the frame buffer according to the address encryption sequence to obtain an encrypted video when the frame buffer is full.

Optionally, the reading each of the image frames in the frame buffer according to the address encryption sequence to obtain the encrypted video when the frame buffer is full comprises:

when the frame buffer is full, storing a newly acquired image frame into a spare frame buffer, and reading each of the image frames in the frame buffer according to the address encryption sequence to obtain an encrypted video;

and when the spare frame buffer is full, storing the newly acquired image frame into the frame buffer, and reading each of the image frames in the spare frame buffer according to a spare address encryption sequence corresponding to the time encryption sequence to obtain the encrypted video.

Optionally, the acquiring the time encryption sequence comprises:

acquiring an encryption sequence, and decrypting the encryption sequence to obtain the time encryption sequence.

Optionally, the storing the image frames into the frame buffer comprises:

sequentially storing the image frames into the frame buffer in an order from a low address to a high address.

The present disclosure further provides a video encryption apparatus comprising:

an image frame acquisition module for continuously acquiring image frames by using an image acquisition component, and storing the image frames into a frame buffer;

an address encryption sequence acquisition module for acquiring a time encryption sequence, and using the time encryption sequence to obtain an address encryption sequence; and a video output module for reading each of the image frames in the frame buffer according to the address encryption sequence to obtain an encrypted video when the frame buffer is full.

Optionally, the video output module comprises:

a first video acquisition unit for when the frame buffer is full, storing a newly acquired image frame into a spare frame buffer, and reading each of the image frames in the frame buffer according to the address encryption sequence to obtain an encrypted video; and a second video acquisition unit for when the spare frame buffer is full, storing the newly acquired image frame into the frame buffer, and reading each of the image frames in the spare frame buffer according to the address encryption sequence to obtain the encrypted video.

Optionally, the address encryption sequence acquisition module comprises:

a time encryption sequence acquisition unit for acquiring an encryption sequence, and decrypting the encryption sequence to obtain the time encryption sequence.

Optionally, the image frame acquisition module comprises:

a sequential storage unit for sequentially storing the image frames into the frame buffer in an order from a low address to a high address.

The present disclosure further provides an image capture device, comprising a processor, an image acquisition component, a frame buffer, a decoder, and a video output port, wherein:

the decoder is connected to the processor for acquiring a time encryption sequence, acquiring an address encryption sequence by using the time encryption sequence, and sending the address encryption sequence to the processor;

the image acquisition component is connected to the frame buffer for acquiring an image frame, and sending the image frame to the frame buffer;

the processor is separately connected to the frame buffer and the decoder for receiving the address encryption sequence sent by the decoder, and sending the address encryption sequence to the frame buffer; and the frame buffer is separately connected to the processor, the video output port, and the image acquisition component for receiving the image frame sent by the image acquisition component, and reading each of the image frames in the frame buffer according to the address encryption sequence and outputting an encrypted video via the video output port.

The present disclosure further provides a computer readable storage medium for storing a computer program, wherein the computer program, when being executed by a processor, implements the video encryption method described above.

It can be seen that the method continuously acquires the image frames and uses the time encryption sequence to obtain the address encryption sequence, and when the frame buffer is full, each of the image frames in the frame buffer is read according to the address encryption sequence to obtain an encrypted video. That is, a function of directly outputting an encrypted video when capturing and outputting a video is realized by changing the temporal order of image frames to obtain the encrypted video, and the security of video information after it is acquired and outputted and before it is subjected to a conventional encryption processing is ensured. The problem of security vulnerabilities in the prior art that there are not any encryption measures for a video after it is outputted and before it is subjected to the conventional encryption processing is solved.

In addition, the present disclosure also provides a video encryption apparatus, an image capture device, and a computer readable storage medium, which also have the above-mentioned beneficial effects.

BRIEF DESCRIPTION OF THE DRAWINGS

In order to more clearly illustrate the technical solutions in embodiments of the present disclosure or the prior art, the accompanying drawings needed to be used in the description of the embodiments or the prior art will be briefly described below. Obviously, the accompanying drawings in the following description are only some embodiments of the present disclosure, and other accompanying drawings can be obtained by ordinary persons skilled in the art from these without any creative efforts.

DETAILED DESCRIPTION

In order to make objects, technical solutions and advantages of the embodiments of the present disclosure clearer, the technical solutions in the embodiments of the present disclosure will be clearly and completely described below in conjunction with the accompanying drawings in the embodiments of the present disclosure. Obviously, the described embodiments are only a part of the embodiments of the present disclosure, not all of the embodiments. All other embodiments obtained by the ordinary persons skilled in the art based on the embodiments of the present disclosure without creative efforts are within the scope of the present disclosure.

Figure 1:
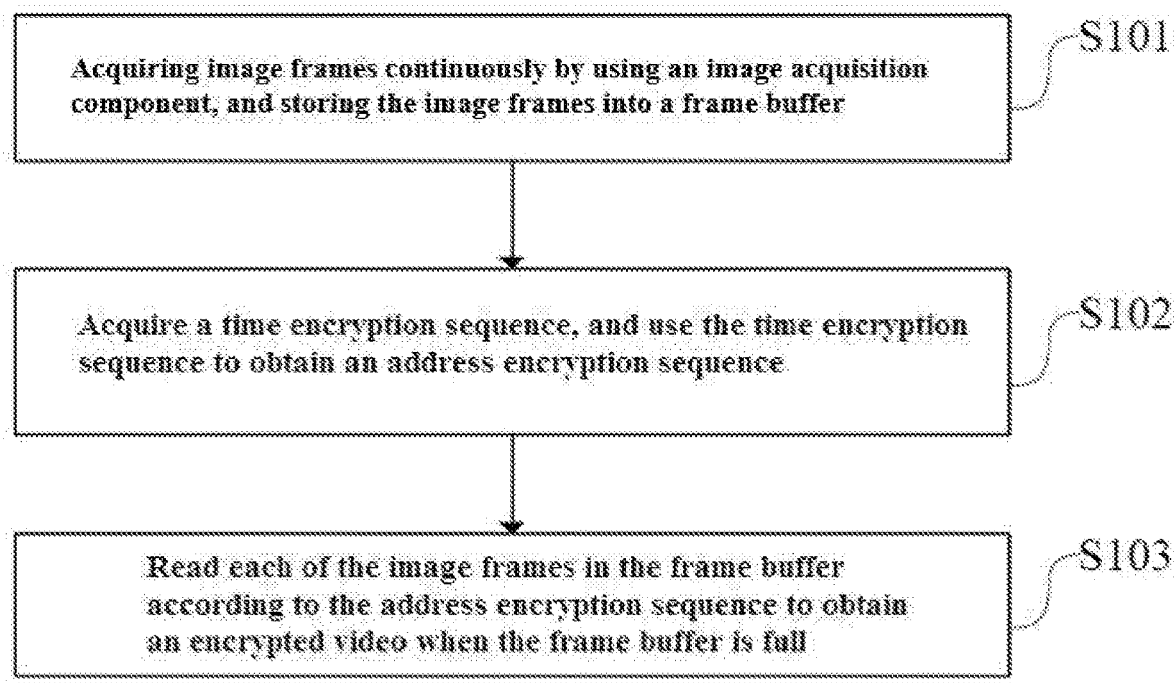
FIG. 1 is a flowchart of a video encryption method according to an embodiment of the present disclosure.

Refer to FIG. 1, which is a flowchart of a video encryption method according to an embodiment of the present disclosure. The method comprises:

S101: acquiring image frames continuously by using an image acquisition component and storing the image frames into a frame buffer.

In the present embodiment, an image acquisition component of an image capture device is used to acquire an image frame. The specific type of the image acquisition component is not limited in the present embodiment, as long as the image frame can be acquired. For example, it may be a pixel array; or may be an Infrared Focal Plane Array (IRFPA). After the image frames are acquired, the image frames are stored into the frame buffer in an order of storage. The specific content of the storage order is not limited in the present embodiment. For example, the image frames may be stored into the frame buffer in an order from a frame low address of the frame buffer to a frame high address; or the image frames may be stored into the frame buffer in an order from a frame high address of the frame buffer to a frame low address. The type of the frame buffer is not limited in the present embodiment. For example, it may be a Double Data Rate Synchronous Dynamic Random Access Memory (DDR SDRAM); or may be a Synchronous Graphics Random Access Memory (SGRAM).

S102: acquiring a time encryption sequence, and using the time encryption sequence to obtain an address encryption sequence.

Specifically, the time encryption sequence is a positional order sequence of individual image frames in a unit encryption time, and the address encryption sequence is acquired by using the time encryption sequence to read the image frames according to the address encryption sequence, thereby realizing the function of being encrypted when the video is output. The address encryption sequence is an arrangement of individual frame addresses in the frame buffer, which corresponds to the time encryption sequence. The image frames can be read from the frame buffer according to the address encryption sequence to obtain an encrypted video corresponding to the time encryption sequence. In the present embodiment, the unit encryption time is not limited, and the specific value of the image frame rate of the video is also not limited. That is, the number of elements in the time encryption sequence is not limited. For example, the unit encryption time may be set to 1 second, and the image frame rate may be 30 Frames Per Second (FPS). That is, 30 image frames in a video with duration of 1 second are changed in sequence to achieve an encryption effect. The unit encryption time may also be set to 5 seconds, and the image frame rate may be 60 FPS. That is, 300 image frames in a video with duration of 5 seconds are changed in sequence to achieve an encryption effect. The more the elements in the time encryption sequence are, the longer the length of the video each time being encrypted is, and the better the encryption effect is.

The method for acquiring the time encryption sequence is not limited in the present embodiment. For example, the time encryption sequence may be set in advance; or an encryption sequence may be acquired and the time encryption sequence is calculated by using the encryption sequence. For the timing of acquiring the time encryption sequence, it is not limited in the present embodiment. For example, when the time encryption sequence is set in advance, the operation of acquiring the time encryption sequence may be started while the acquisition of the image frames is started, or the operation of acquiring the time encryption sequence may be started while the image frames in the frame buffer need to be read. Alternatively, when the time encryption sequence is calculated by using the encryption sequence, the operation of acquiring the time encryption sequence may be started immediately after the encryption sequence is acquired. When the time encryption sequence needs to be calculated by using the encryption sequence, the present embodiment does not limit the specific calculation method. For example, a chaotic encryption system may be used to calculate a chaotic sequence corresponding to the encryption sequence, and the chaotic sequence is used as the time encryption sequence. For example, a logistics mapping expression, namely $x_{k+1}=\mu x_k(1-x_k)$, may be used to calculate the chaotic sequence. Herein, $\mu$ is a constant parameter, $x_k$ is the k-th element in x sequence, and $x_{k+1}$ is the (k+1)-th element in x sequence.

In order to improve the encryption capability to obtain a better encryption effect, it is preferable in the present embodiment that a preset decryption rule may be set. After acquiring the encryption sequence, the encryption sequence is decrypted by using the preset decryption rule to obtain the time encryption sequence. The specific content of the preset decryption rule is not limited in the present embodimen, as long as it corresponds to the encryption rule used when obtaining the encryption sequence. After obtaining the time encryption sequence, the address encryption sequence corresponding to the time encryption sequence is acquired according to a preset address conversion rule. The preset address conversion rule is set in advance to perform the conversion of the time encryption sequence and the address encryption sequence, of which the specific content is not limited herein, as long as the address encryption sequence corresponding to the time encryption sequence can be acquired.

Further, an encryption sequence comparison table may be also provided. After acquiring the encryption sequence, the encryption time sequence corresponding to the encryption sequence is acquired by the encryption sequence comparison table, and then the encryption time sequence is subjected to a chaotic encryption calculation to obtain an address encryption sequence for achieving secondary encryption. The time encryption sequence can be quickly acquired by the encryption sequence comparison table, and the chaotic calculation of the time encryption sequence to obtain the address encryption sequence can further improve the encryption effect. Even if the encryption sequence comparison table is leaked, the confidential function can be realized to prevent the encrypted video from being cracked, thereby causing leakage of important video information.

S103: reading each of the image frames in the frame buffer according to the address encryption sequence to obtain an encrypted video when the frame buffer is full.

After the image frames are acquired by the image acquisition component of the image capture device, the image frames are stored in the frame buffer. After the frame buffer is full, the image frames in the frame buffer are read in an order of elements in the address encryption sequence to obtain the encrypted video. Herein, the number of elements in the address encryption sequence is the same as the number of elements in the time encryption sequence, and is also the same as the number of frame addresses in the frame buffer.

Specifically, the image frames are stored in the frame buffer in an order from a frame low address to a frame high address. The address range of the frame buffer is A0001 to A0030. That is, the time encryption sequence and the address encryption sequence each contain 30 elements. When the time encryption sequence is {2, 5, 13, 29, 1, 11, 9, 6, 10, 23, 8, 22, 16, 14, 26, 17, 18, 12, 21, 4, 25, 7, 24, 20, 30, 27, 3, 15, 28, 19}, the address encryption sequence corresponding thereto is {A0002, A0005, A0013, A0029, A0001, A0011, A0009, A0006, A0010, A0023, A0008, A0022, A0016, A0014, A0026, A0017, A0018, A0012, A0021, A0004, A0025, A0007, A0024, A0020, A0030, A0027, A0003, A0015, A0028, A0019}. Starting from the first element of the address encryption sequence, starting from A0002, the image frames in the frame buffer are read according to the address encryption sequence, and outputted in order, and therefore the encrypted video can be directly output.

Further, in order to reduce the read/write frequency of the frame buffer and reduce the operation speed of the processor at the same time, it is preferable in the present embodiment that two frame buffers may be set, that is, one frame buffer and one spare frame buffer are set. When the frame buffer is full, a newly acquired image frame is stored in the spare frame buffer, and at the same time, each image frame in the frame buffer is read according to the address encryption sequence to obtain the encrypted video. When the spare frame buffer is full, the newly acquired image frame is stored in the frame buffer, and each image frame in the spare frame buffer is read according to the spare address encryption sequence corresponding to the time encryption sequence to obtain the encrypted video. This can reduce the read/write frequency of the frame buffer and reduce the loss of the frame buffer. At the same time, the requirement for the operation speed of the processor can be reduced, the video output speed is allowed to be reduced without affecting the operation of acquiring image frames, and the image frames are stored in the frame buffer.

Specifically, in the present embodiment, the image frames are separately stored in the frame buffer and the spare frame buffer in the order of the elements in the address encryption sequence and the spare address encryption sequence. For example, when the address range of the frame buffer is A0001 to A0005 and the address range of the spare frame buffer is A0006 to A0010, the time encryption sequence, the address encryption sequence, and the spare address encryption sequence each contain 5 elements. When the time encryption sequence is {1, 5, 4, 3, 2}, the address encryption sequence thereof is {A0001, A0005, A0004, A0003, A0002}, and the spare address encryption sequence is {A0006, A0010, A0009, A0008, A0007}. After acquiring the image frames, the image frames are stored in the frame buffer according to the address encryption sequence. That is, a first image frame is stored in A0001, a second image frame is stored in A0005, a third image frame is stored in A0004, a fourth image frame is stored in A0003, and a fifth image frame is stored in A0002. After the fifth image frame is stored in the frame buffer, the image frames are read from the frame buffer in a reading order from a low address to a high address. That is, the frame order in the output encrypted video is the first image frame, the fourth image frame, the fifth image frame, the third image frame, and the second image frame. When the encrypted video is output, the image frames can be acquired at the same time, and the image frames are stored in the spare frame buffer according to the spare address encryption sequence. That is, a sixth image frame is stored in A0006, a seventh image frame is stored in A0010, an eighth image frame is stored in A0009, a ninth image frame is stored in A0008, and a tenth image frame is stored in A0007. After the tenth image frame is stored in the frame buffer, the image frames are read from the frame buffer in a reading order from a low address to a high address. That is, the frame order in the output encrypted video is the sixth image frame, the ninth image frame, the tenth image frame, the eighth image frame, and the seventh image frame. At the same time, the newly acquired image frame can be stored in the spare frame buffer. Looping in sequence can reduce the read/write frequency of the frame buffer and the spare frame buffer and reduce the loss. At the same time, the requirement for the operation speed of the processor can be reduced, the video output speed is allowed to be reduced without affecting the operation of acquiring image frames, and the image frames are stored in the frame buffer.

The video encryption method provided by the embodiment of the present disclosure continuously acquires image frames and stores the image frames in a frame buffer, while acquiring an encryption sequence, decrypting the encryption sequence to obtain a time encryption sequence, and obtaining an address encryption sequence by using the time encryption sequence. When the frame buffer is full, each image frame in the frame buffer is read according to the address encryption sequence to obtain the encrypted video. That is, a temporal order of image frames is changed to realize an encryption effect, and the security of video information after it is acquired and outputted and before it is subjected to the conventional encryption processing is ensured. The problem of security vulnerabilities in the prior art that there are not any encryption measures for the video after it is outputted and before it is subjected to the conventional encryption processing is solved.

A video encryption apparatus provided by an embodiment of the present disclosure will be introduced below. The video encryption apparatus described below and the video encryption method described above may be referred to each other.

Figure 2:
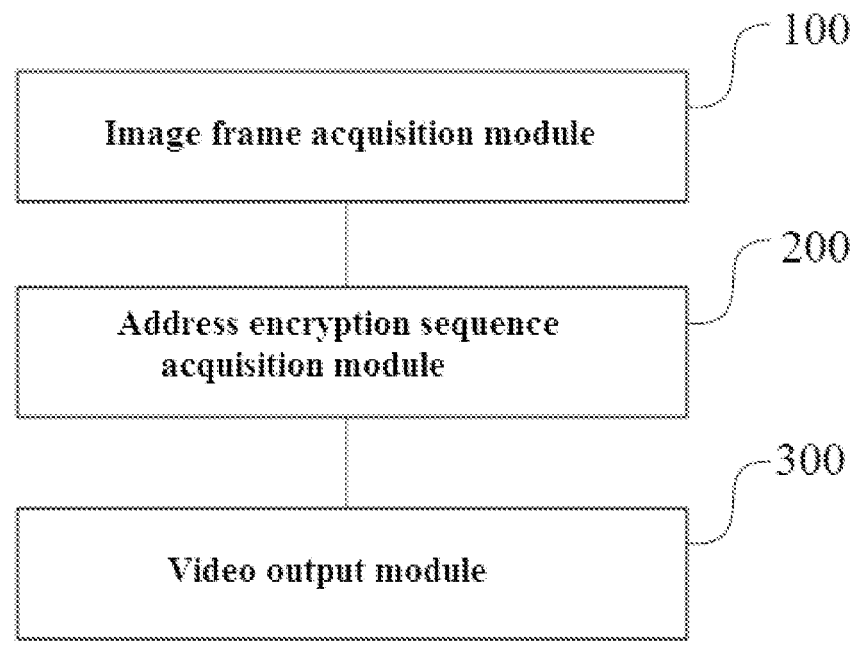
FIG. 2 is a structural schematic view of a video encryption apparatus according to an embodiment of the present disclosure.

Refer to FIG. 2, which is a structural schematic view of a video encryption apparatus according to an embodiment of the present disclosure, including:

an image frame acquisition module 100 for continuously acquiring image frames by using an image acquisition component, and storing the image frames into a frame buffer;

an address encryption sequence acquisition module 200 for acquiring a time encryption sequence, and using the time encryption sequence to obtain an address encryption sequence; and a video output module 300 for reading each of the image frames in the frame buffer according to the address encryption sequence to obtain an encrypted video when the frame buffer is full.

The video encryption apparatus provided by the embodiment of the present disclosure continuously acquires image frames and stores the image frames in a frame buffer, while acquiring an encryption sequence, decrypting the encryption sequence to obtain a time encryption sequence, and obtaining an address encryption sequence by using the time encryption sequence. When the frame buffer is full, each image frame in the frame buffer is read according to the address encryption sequence to obtain the encrypted video. That is, a temporal order of image frames is changed to realize an encryption effect, and the security of video information after it is acquired and outputted and before it is subjected to the conventional encryption processing is ensured. The problem that the existing video encryption technology has security vulnerabilities is solved.

Optionally, the video output module 300 includes:

a first video acquisition unit for when the frame buffer is full, storing a newly acquired image frame into a spare frame buffer, and reading each of the image frames in the frame buffer according to the address encryption sequence to obtain an encrypted video; and a second video acquisition unit for when the spare frame buffer is full, storing the newly acquired image frame into the frame buffer, and reading each of the image frames in the spare frame buffer according to a spare address encryption sequence corresponding to the time encryption sequence to obtain the encrypted video.

Optionally, the address encryption sequence acquisition module 200 includes:

a time encryption sequence acquisition unit for acquiring an encryption sequence, and decrypting the encryption sequence to obtain the time encryption sequence.

Optionally, the image frame acquisition module 100 includes:

a sequential storage unit for sequentially storing the image frames into the frame buffer in an order from a low address to a high address.

An image capture device provided by an embodiment of the present disclosure will be introduced below. The image capture device described below and the video encryption method described above may be referred to each other.

Figure 3:
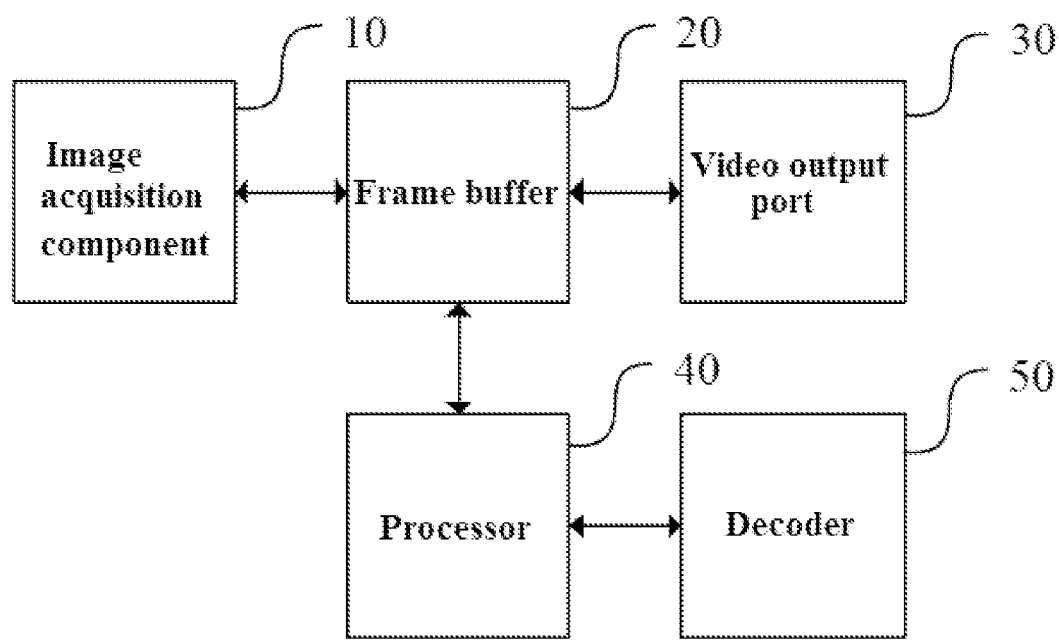
FIG. 3 is a structural schematic view of an image capture device according to an embodiment of the present disclosure.

Refer to FIG. 3, which is a structural schematic view of an image capture device according to an embodiment of the present disclosure. The image capture device includes an image acquisition component 10, a frame buffer 20, a video output port 30, a processor 40, and a decoder 50, wherein:

the decoder 50 is connected to the processor 40 for acquiring a time encryption sequence, acquiring an address encryption sequence by using the time encryption sequence, and sending the address encryption sequence to the processor 40;

the image acquisition component 10 is connected to the frame buffer 20 for acquiring image frames and sending the image frames to the frame buffer 20;

the processor 40 is separately connected to the frame buffer 20 and the decoder 50 for receiving the address encryption sequence sent by the decoder 50, and sending the address encryption sequence to the frame buffer 20; and the frame buffer 20 is separately connected to the processor 40, the video output port 30 and the image acquisition component 10 for receiving the image frame sent by the image acquisition component 10, and reading each image frame in the frame buffer 20 according to the address encryption sequence when it is full, and outputting the encrypted video via the video output port 30.

A computer readable storage medium provided by an embodiment of the present disclosure will be introduced below. The computer readable storage medium described below and the video encryption method described above may be referred to each other.

The present disclosure further provides a computer readable storage medium having stored thereon a computer program that, when being executed by a processor, implements the steps of the video encryption method described above.

The computer readable storage medium may include: a U disk, a mobile hard disk, a Read-Only Memory (ROM), a Random Access Memory (RAM), a magnetic disk, or an optical disk, or various media, which can store program codes.

Various embodiments in the description are described in a progressive manner, and each embodiment focuses on the differences from other embodiments, and the same or similar parts between various embodiments may be referred to each other. For the apparatus disclosed in the embodiment, since it corresponds to the method disclosed in the embodiment, the description is relatively simple, and for a relevant part, the description of the method part can be referred to.

A person skilled in the art may further appreciate that units and algorithm steps of various examples described in conjunction with the embodiments disclosed herein can be implemented by electronic hardware, computer software or a combination of both. In order to clearly illustrate the interchangeability of hardware and software, the constitutions and steps of the various examples have been generally described in terms of functions in the above description. Whether these functions are performed by means of hardware or software depends on a specific application and design constraints of the technical solution. The person skilled in the art may use different methods to implement the described functions for each specific application, but such implementation should not be considered to be beyond the scope of the present disclosure.

The steps of the method or algorithm described in conjunction with the embodiments disclosed herein may be implemented directly by hardware, software modules executed by a processor, or a combination of both. The software modules may be placed in a Random Access Memory (RAM), memory, a Read Only Memory (ROM), an electrically programmable ROM, an electrically erasable programmable ROM, a register, a hard disk, a removable disk, a CD-ROM, or a storage medium in any other form well known in the art.

Finally, it should also be noted that the relationships such as first and second herein are used merely to distinguish one entity or operation from another entity or operation, and do not necessarily require or imply that there are any such actual relationships or orders between these entities or operations. Furthermore, the terms "comprise," "comprising," "include" or "including" or any other variants are intended to include a non-exclusive inclusion, so that a process, a method, an article, or an image capture device including a series of elements not only includes those elements but also includes other elements not explicitly listed, or further includes elements that are inherent to the process, the method, the article, or the image capture device.

The video encryption method and apparatus, the image capture device and the computer readable storage medium provided by the present disclosure are introduced in detail above. The principles and embodiments of the present disclosure are described herein by using the specific examples. The description of the above embodiments is only used to help understand the method and the core idea of the present disclosure. At the same time, for the ordinary persons skilled in the art, according to the idea of the present disclosure, there will be changes in the specific embodiments and application scopes. In summary, the content of the present description should not be construed as limiting the present disclosure.

What is claimed is:

1. A video encryption method, comprising:
    acquiring image frames continuously by using an image acquisition component, and storing the image frames into a frame buffer;
    acquiring a time encryption sequence, and using the time encryption sequence to obtain an address encryption sequence; and
    reading each of the image frames in the frame buffer according to the address encryption sequence to obtain an encrypted video when the frame buffer is full,
    wherein the reading each of the image frames in the frame buffer according to the address encryption sequence to obtain the encrypted video when the frame buffer is full comprises:
        when the frame buffer is full, storing a newly acquired image frame into a spare frame buffer, and reading each of the image frames in the frame buffer according to the address encryption sequence to obtain an encrypted video; and
        when the spare frame buffer is full, storing the newly acquired image frame into the frame buffer, and reading each of the image frames in the spare frame buffer according to a spare address encryption sequence corresponding to the time encryption sequence to obtain the encrypted video.

2. The video encryption method according to claim 1, wherein the acquiring the time encryption sequence comprises:
    acquiring an encryption sequence, and decrypting the encryption sequence to obtain the time encryption sequence.

3. The video encryption method according to claim 1, wherein the storing the image frames into the frame buffer comprises:
    sequentially storing the image frames into the frame buffer in an order from a low address to a high address.

4. A video encryption apparatus, comprising:
    an image frame acquisition module for continuously acquiring image frames by using an image acquisition component, and storing the image frames into a frame buffer;
    an address encryption sequence acquisition module for acquiring a time encryption sequence, and using the time encryption sequence to obtain an address encryption sequence; and
    a video output module for reading each of the image frames in the frame buffer according to the address encryption sequence to obtain an encrypted video when the frame buffer is full,
    wherein the video output module comprises:
        a first video acquisition unit for when the frame buffer is full, storing a newly acquired image frame into a spare frame buffer, and reading each of the image frames in the frame buffer according to the address encryption sequence to obtain an encrypted video; and
        a second video acquisition unit for when the spare frame buffer is full, storing the newly acquired image frame into the frame buffer, and reading each of the image frames in the spare frame buffer according to the address encryption sequence to obtain the encrypted video.

5. The video encryption apparatus according to claim 4, wherein the address encryption sequence acquisition module comprises:
    a time encryption sequence acquisition unit for acquiring an encryption sequence, and decrypting the encryption sequence to obtain the time encryption sequence.

6. The video encryption apparatus according to claim 4, wherein the image frame acquisition module comprises:
    a sequential storage unit for sequentially storing the image frames into the frame buffer in an order from a low address to a high address.

7. An image capture device, comprising a processor, an image acquisition component, a frame buffer, a spare frame buffer, a decoder, and a video output module, wherein:
    the decoder is connected to the processor for acquiring a time encryption sequence, acquiring an address encryption sequence by using the time encryption sequence, and sending the address encryption sequence to the processor;
    the image acquisition component is connected to the frame buffer and the spare frame buffer for acquiring an image frame, and sending the image frame to the frame buffer or the spare frame buffer;
    the processor is separately connected to the frame buffer, the spare frame buffer and the decoder for receiving the address encryption sequence sent by the decoder, and sending the address encryption sequence to the frame buffer or the spare frame buffer; and the frame buffer and the spare frame buffer is separately connected to the processor, the video output module, and the image acquisition component for receiving the image frame sent by the image acquisition component, wherein the video output module comprises:
- a first video acquisition unit for when the frame buffer is full, storing a newly acquired image frame into a spare frame buffer, and reading each of the image frames in the frame buffer according to the address encryption sequence to obtain an encrypted video; and
- a second video acquisition unit for when the spare frame buffer is full, storing the newly acquired image frame into the frame buffer, and reading each of the image frames in the spare frame buffer according to the address encryption sequence to obtain the encrypted video.

8. A computer readable storage medium for storing a computer program, wherein the computer program, when being executed by a processor, implements the video encryption method according to claim 1.

* * * * *